Patented Nov. 13, 1934

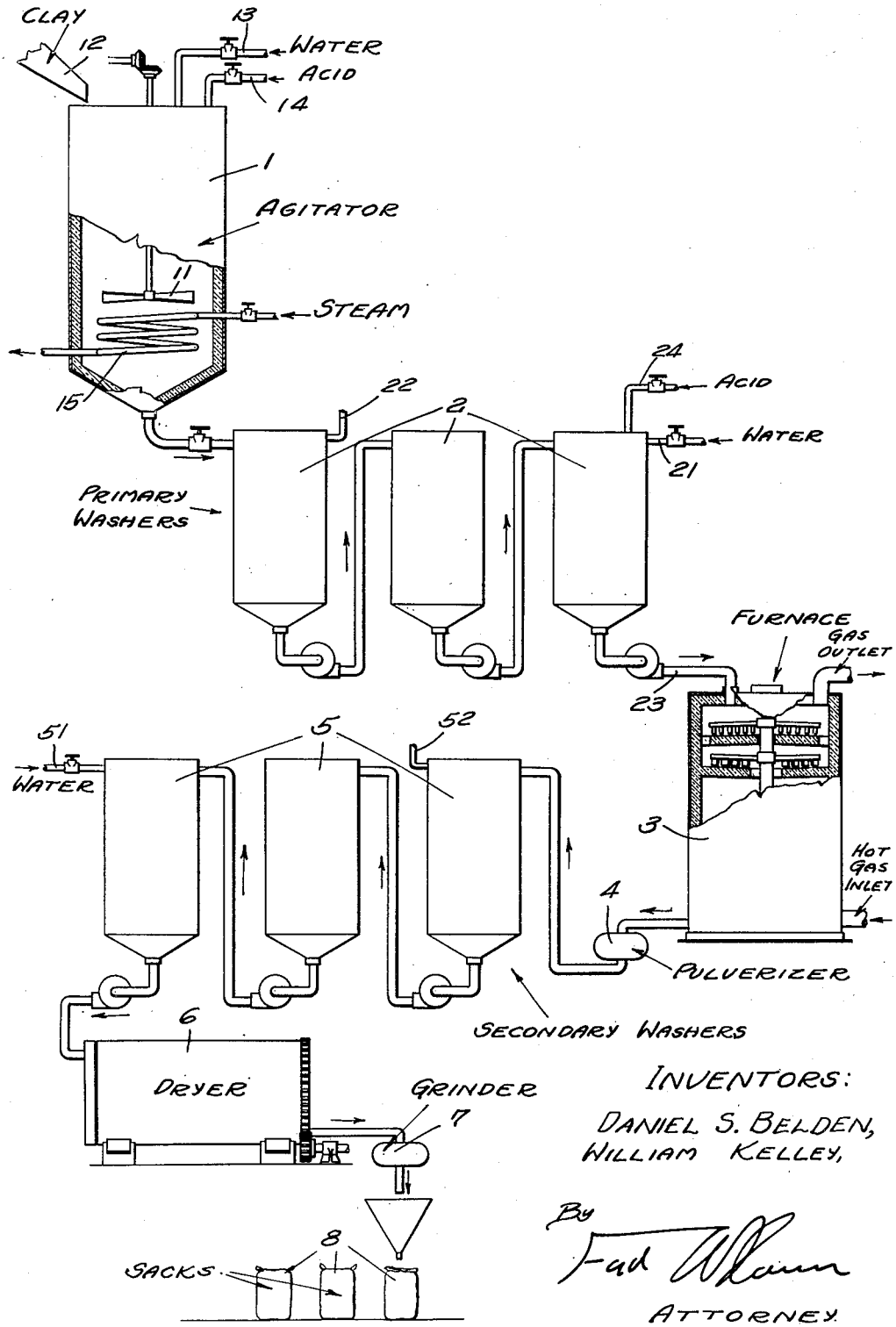

1,980,569

UNITED STATES PATENT OFFICE 1,980,569

METHOD OF PREPARING ABSORBENT LOW IN SALTS AND FREE FROM ACID

Daniel S. Belden and William Kelley, Los Angeles, Calif., assignors to Filtrol Company of California, Los Angeles, Calif., a corporation of California Application September 2, 1930, Serial No. 479,278

5 Claims. (Cl. 252—2)

Our invention relates to the art of producing activated adsorbent clay. Many clays (and particularly fuller's earth) have in their natural state considerable adsorptive capacity for the impurities in oils, both mineral and edible, and have been used for many years to decolorize and clarify such oils.

Many other clays variously termed "bentonites", "montmorillonites", etc., but more properly classified as "smectites", have very little natural adsorptive capacity but when treated with acids (usually sulphuric or hydrochloric acid) develop a very high adsorptive capacity. Such treated clays are commonly called "acid-activated" clays.

Acid-activated clays are usually thoroughly washed with water after activation for the purpose of removing excess acid, acid reaction products, and other substances that are water soluble or may be removed in suspension in the water. It is possible by repeated washing to remove all but a small part of the free acid and other deleterious impurities from the acid-activated clay.

It is an object of our invention to provide a process by which an acid-activated clay low in salts and stable in efficiency may be produced.

Attempts have been made to neutralize acid-treated activated clays by conventional chemical methods, notably by the application of alkaline reagents, such as solutions of alkalis thereto. Our experience indicates that such conventional methods have been unsuccessful, partly because they are ineffective in entirely neutralizing all of the substances which produce an acid reaction with the oil, partly because they introduce into the clays substances which themselves react deleteriously with oils, and partly because any conventional alkaline neutralizing reagent with which we are familiar tends to impair or destroy the decolorizing efficiency of the clay.

It is a further object of our invention to provide a process which will produce an acid-activated clay without the use of neutralizing chemicals so that the activated clay has a high potency and does not deleteriously act in any way upon oils.

Our process may be carried on in many types of apparatus, that shown diagrammatically on the annexed drawing being well suited to the purpose. All of the individual units of which this apparatus is composed are well known in the art, and other well known types may be substituted therefor without departing from the spirit of our invention.

In the apparatus shown in the drawing we provide an agitator 1, a series of primary washers and thickeners 2, a drier 6, and a secondary grinder 7.

The agitator 1 is a tank suited to contain a suspension of clay in water (and capable of resisting the action of acid contained in said water), provided with agitating means such as a rotating paddle 11. Clay may be delivered to the agitator through a chute 12, water through a pipe 13, and acid (or acid in solution in water) through a pipe 14. Means such as the steam coil 15 is provided for heating the material in the agitator.

The primary washers and thickeners 2 may be of any convenient type. Water, preferably softened water free from calcium compounds, is delivered to said washers through a pipe 21 near the outlet end thereof, and flows through the washers counter-current to the flow of clay suspension or pulp therein. The washers or thickeners 2 may be conveniently used to reduce the amount of water in the pulp so that it leaves the washers 2 through a pipe 23 in a thickened condition. The wash water may be taken off through the pipe 22. An acid pipe 24 is provided, by which free acid may be introduced into the pulp just prior to its leaving the last washer 2.

The main purpose of the washers 2 is primarily to wash from the pulp substances soluble in water or capable of being carried in suspension therein, the thickening of the pulp being merely a matter of economy. By thickening the pulp as much as possible without rendering it so thick that it will not flow readily, we reduce the amount of water which must be evaporated in the furnace 3.

By the use of the acid pipe 24 we are able to increase the amount of free mineral acid in the pulp passing to the furnace 3 to certain critical proportions which will cause the physical and chemical changes in the clay.

The furnace 3 may be of any convenient type but is preferably a hearth type of furnace in which the clay is subjected to heat sufficient to thoroughly dry same without calcination.

The primary grinder or pulverizer 4 is of any type capable of breaking up lumps of clay, it not being necessary to subject the clay to fine grinding at this point.

The secondary washers and thickeners 5 are similar in construction to the primary washers 2, softened wash water being delivered thereto through a pipe 51 and excess wash water being removed through the pipe 52.

The drier 6 is preferably a rotary drier in which the clay is dried so that it is in commercial condition with only a few per cent of water therein.

The secondary grinder 7 is of any convenient form capable of reducing the clay so that 90% to 99% and a fraction will pass a 200-mesh screen.

The method of operation of our process is as follows:

In the practical operation of our process we utilize a raw clay of the smectite type. We have found that a clay produced from a deposit near Chambers, Arizona, is well suited to our purpose. A rough analysis of one sample of this clay gives the following:

|  | Percent |
|---|---|
| Silica $SiO_2$ | 57.50 |
| Alumina $Al_2O_3$ | 21.00 |
| Ferric oxide $Fe_2O_3$ | 3.20 |
| Calcium oxide $CaO$ | 1.11 |
| Magnesium oxide $MgO$ | 3.09 |
| Volatile matter and water | 14.10 |

It will be seen that this clay is a hydrous aluminum silicate and we have found that many clays of this class may be utilized by our process.

This clay differs from fuller's earth in that it has a small initial adsorbent capacity which is greatly improved by acid activation.

The process may be applied to other clays, or blends of clays, that above identified being for the purpose of illustration only.

The clay, preferably pulverized to pass a 40-mesh screen, is delivered to the agitator 1 through the chute 12 either in dry form or after sliming with water. In the agitator it is mixed with water from the pipe 14 to form a pulp containing about equal parts, by weight, of water and clay, a considerable excess of water not being, however, objectionable. To the pulp is then added sulphuric acid (66° Baume) to an amount equal to something less than one-third of the weight of raw clay. Hydrochloric or other acid may be used but we have found in practice that sulphuric acid gives excellent results.

The clay, water, and acid are intimately mixed by the paddles 11 and the pulp is heated by the steam coil 15 preferably to about the boiling point of water.

The acid treatment is preferably not continued until all the free acid is consumed and the pulp at the end of the acid treatment may contain considerable free mineral acid therein. The pulp containing this free acid is then passed through the washers 2 where it is washed to remove water soluble matter.

We have had a wide experience with the production of acid-activated clays and have subjected pulp similar to that leaving the washers 2 to repeated washings with softened water without being able to produce an acid-activated clay low in water soluble salts.

By this method we produce a product containing no free mineral acid and less than 1/100 of 1% salts.

For the purpose of eliminating these substances we proceed as follows:

Since we do not depend upon washing in the washers 2 to neutralize the clay, we do not thoroughly wash out the acid, and in fact prefer to add sulphuric acid to an amount equal to about one per cent of the weight of the solids in the pulp to the pulp through the pipe 24 before the pulp passes to the furnace 3.

The pulp contains about 1% free mineral acid and about 4% salts. By addition of excess acid we change this ratio to from 2 to 8% free mineral acid to 1 to 4% salts. We attempt to secure a ratio of 2 to 1, free mineral acid to salts.

In the furnace 3 the clay is heated to a temperature sufficient to carry off all moisture and cause a reaction between the clay and acid present. A temperature of 250° F. may be sufficient for this purpose but higher temperatures, running perhaps as high as 750° F. may be used, depending upon the product desired. It is important that the temperature is not raised to a point where sintering or glazing of the clay occurs.

The exact temperature used in the furnace 3 depends partly upon the character of the clay used and the nature of some constituents thereof, such as the calcium salts. The temperatures are always held under that which will produce any diminution of adsorptive power and is kept as low as will give the desired effect to any particular clay.

The heating in the furnace 3 of clay in the presence of acid produces a marked alteration of the clay. We are not prepared at this time to say exactly what chemical or physical changes occur, but we know that some alterations in composition or structure take place which vitally affect the final product as to stability of the efficiency secured. In other words, the bleaching power of the product so secured does not deteriorate over a considerable period of storage time, such as a year or more before use.

The clay is preferably passed from the furnace 3 through a pulverizer 4 which breaks up any lumps in the clay and facilitates washing in the secondary washers 5. In the washers 5 the clay is thoroughly mixed with water and washed, preferably with softened water, and the washed pulp is delivered to the drier 6 in which it is dried. The dried pulp is then ground in the grinder 7 so that the greater portion will pass a 200-mesh screen and is preferably packaged in sacks 8. The last washing may be omitted if desired.

We claim as our invention:

1. A process of producing an activated clay which comprises: treating a clay with a solution of acid in water for a sufficient time to allow the acid to substantially fully react with the clay; washing the treated clay to remove the water soluble impurities therefrom; heating the washed clay to a sufficient temperature and for a sufficient time to drive off the water therefrom; and washing the dried clay to remove any water soluble impurities therefrom.

2. A process of producing an activated clay which comprises: treating a clay with a solution of acid in water for a sufficient time to allow the acid to substantially fully react with the clay; washing the treated clay to remove the water soluble impurities therefrom; adding acid to the washed clay; heating the washed clay to a sufficient temperature and for a sufficient time to drive off the water therefrom; and washing the dried clay to remove any water soluble impurities therefrom.

3. A process of producing an activated clay which comprises: treating a clay with a solution of acid in water so that the acid will substantially fully react with the clay; washing the treated clay to remove soluble impurities therefrom; heating the washed clay to a sufficient temperature and for a sufficient time to evaporate the water therefrom; washing the dried clay to remove water soluble impurities therefrom; and thereafter drying the washed clay.

4. A process of producing an activated clay which comprises: treating a clay with a solution of acid in water to allow the acid to substantially react with the clay; washing the treated clay in a solution of acid in water to remove soluble impurities therefrom; heating the washed clay to a sufficient temperature and for a sufficient time to evaporate the water therefrom; washing the dried clay to remove the remaining soluble impurities therefrom; and thereafter drying the clay.

5. A process of producing an activated clay which comprises: treating a clay with a heated solution of acid and water so that the acid will be caused to react with the clay; washing the treated clay in a solution of acid and water to remove soluble impurities therefrom; heating the washed clay to remove the water therefrom; washing the dried clay in water to remove the remaining soluble impurities therefrom; and thereafter drying the rewashed clay.

DANIEL S. BELDEN.
WILLIAM KELLEY.